United States Patent [19] [11] Patent Number: 5,007,498
Wiese et al. [45] Date of Patent: Apr. 16, 1991

[54] DRIVING ASSEMBLY

[75] Inventors: Helmut Wiese, Neunkirchen-Seelscheid; Paul-Erich Schönenbrëcher, Much-Kranüchel, both of Fed. Rep. of Germany

[73] Assignee: Viscodrive GmbH, Lohmar, Fed. Rep. of Germany

[21] Appl. No.: 399,823

[22] Filed: Aug. 29, 1989

[30] Foreign Application Priority Data

Sep. 6, 1988 [DE] Fed. Rep. of Germany ....... 3830199

[51] Int. Cl.$^5$ ............................................. B60K 23/08
[52] U.S. Cl. ................................. 280/248; 280/249; 192/35
[58] Field of Search ............... 180/247, 248, 249, 250; 280/76; 74/650; 188/267; 192/35, 38, 44, 47, 57

[56] References Cited

U.S. PATENT DOCUMENTS

| 4,030,581 | 6/1977 | Giometti | 192/44 X |
| 4,744,435 | 5/1988 | Schnurer | 180/250 X |
| 4,853,573 | 8/1989 | Wolcott et al. | 188/267 |

FOREIGN PATENT DOCUMENTS

| 3317247 | 11/1984 | Fed. Rep. of Germany |
| 3708193 | 10/1987 | Fed. Rep. of Germany |
| 3735823 | 10/1987 | Fed. Rep. of Germany |
| 2381208 | 10/1978 | France | 192/84 PM |
| 1403682 | 8/1975 | United Kingdom | 188/267 |

Primary Examiner—Charles A. Marmor
Assistant Examiner—Victor E. Johnson
Attorney, Agent, or Firm—Toren, McGeady & Associates

[57] ABSTRACT

A driving assembly includes a viscous shear coupling (15), a clutch (17) and a hysteresis or eddy current brake (19). The clutch comprises inner and outer parts (20 and 21) between which are received torque-transmitting balls (18) received in a cage (16) to which is connected a disc (30) forming part of the brake. The outer part (21) can overrun the inner part whether or not the brake is actuated. The inner part (20) can overrun the outer part (21) if the brake (19) is not actuated but drives the outer part (21) if the brake is actuated. The outer part (21) is connected to one part of the viscous shear coupling (15). A drive member (34) is connected to the inner clutch part (20) and a driven member (38) forms the other part of the viscous shear coupling.

12 Claims, 4 Drawing Sheets

DRIVING ASSEMBLY

BACKGROUND TO THE INVENTION

1. Field of the Invention

This invention relates to to a driving assembly comprising a drive member, a driven member, a viscous shear coupling and a clutch between the driven member and the viscous shear coupling and selectively operable to allow torque to be transmitted from the drive member to the viscous shear coupling and from the viscous shear coupling to the driven member.

Such a drive assembly finds particular application in a drive transmission for a motor vehicle in which there is a prime mover and a drive line between the prime mover and the road wheels. The drive line can include a driving assembly as described so that the drive may be selectively applied to the road wheels through the driving assembly.

More particularly, the arrangement is useful in a four-wheel drive vehicle in which one set of road wheels is directly driven from the prime mover and the other set of road wheels is driven through a driving assembly as described only when the directly driven wheels begin to slip.

2. Description of Prior Art

It is known in a four-wheel drive vehicle to have one set of road wheels directly driven from the prime mover and the other set of road wheels driven via a viscous shear coupling. Such a coupling may, for example, comprise a housing and a hub with the hub being rotatably mounted in the housing. There are two sets of plates, the plates of one set being carried by the housing and the plates of the other set being carried by the hub. These plates are interleaved and the housing contains a viscous liquid such for example as a silicone oil. Such a viscous coupling is shown, for example, in U.S. Pat. No. 3,760,922.

With such a coupling, torque is transferred between the housing and the hub when there is a relative speed difference between them as a result of shearing of the silicone fluid between adjacent plates. As is mentioned above this drive may be used to drive one set of wheels when the directly driven wheels tend to slip.

In the prior art, where a viscous shear coupling is interposed in the drive line to a set of wheels, torque is transmitted to those wheels whenever a speed difference occurs between the two sets of wheels. However disadvantages can occur where the vehicle is equipped with anti-lock braking.

Moreover, if it is the front wheels that are directly driven and if these tend to lock on braking so that a speed difference occurs between the front and rear wheels, torque can be transmitted by the viscous shear coupling to the rear wheels while the front wheels are locked; this tends to make the vehicle unstable.

Various proposals have been made to solve this problem by disconnecting the viscous coupling so there is no tendency to drive the rear wheels. Thus if the rear wheels overrun the front wheels there is in effect a free wheel device. It has also been proposed that when the brakes are applied the drive to the viscous coupling is disconnected.

SUMMARY OF THE INVENTION

It is an object of the present invention to provide a driving assembly which has the features described above, i.e. it may be used selectively to drive a set of road wheels and to disconnect drive therefrom, without the disconnection device being subjected to wear in operation and in which, if the driven wheels tend to rotate faster than the drive, the device acts as a free wheel.

According to the invention we provide a drive member; a driven member; a viscous shear coupling; and a clutch between the drive member and the viscous shear coupling and comprising a drive part connected to the drive member and a driven part connected to the viscous shear coupling, torque transmitting elements between said parts, a control member interposed between said parts and with which said elements are engaged and a non-contact brake associated with the control member and selectively operable to brake said control member such that if the driven part overruns the drive part the clutch transmits no torque while if the drive part overruns the driven part torque is transmitted from the drive part to the driven part by said torque transmitting elements when the brake acts to brake said control member but the clutch transmits no torque when said control member is not braked.

By a non-contact brake we mean a brake in which the members do not come into physical contact. By using a contact-free brake we can ensure that the operation of the brake does not develop heat which tends to change the behaviour of the brake. Thus the brake has a consistent performance, moreover, even if the brake is permanently engaged to bring the viscous coupling into the drive line, there is no wear.

Preferably, the said parts of the clutch and the control member are arranged to be relatively rotatable about a common axis and the control member is arranged between said parts and is provided with apertures in which rolling elements which form the torque transmitting members are received so as to engage said parts.

The parts of the clutch may be arranged concentrically to provide an inner part and an outer part and each rolling element may be a ball which is received in a radial aperture in the control member and which engages a cylindrical track on the outer part and a generally flat face on the inner part, the inner part having a number of relatively inclined flat faces equal to the number balls, spring means being provided to bias the inner part to a position in which no torque is transmitted by the balls between the said parts.

The inner part may be provided with an aperture bounded by opposite sides and the control member may have projections extending into said aperture, said spring means acting between said projections and said sides of the aperture.

In one embodiment the brake is a hysteresis brake. In this case the brake may comprise a brake disc of hysteresis material connected to the control member, a magnet and means to move the magnet towards and away from the disc. The magnet may comprise an annular permanent magnet mounted in a soft iron sleeve with the drive member passing rotatably through the central aperture of the magnet, the latter being slidable relative to the drive member.

In an alternative embodiment the brake is an eddy current brake. In this case there is a brake disc connected to the control member and an electro-magnet embracing the edge of the disc.

Preferably the clutch is arranged so that the inner part is the drive part and the outer part is the driven part.

The invention also provides a drive transmission for a motor vehicle comprising a prime mover and a drive line between the prime mover and road wheels of the vehicle, the drive line including an assembly as described above in which the drive member is connected to the prime mover and the driven member is connected to the road wheels.

The invention also includes a four-wheel drive vehicle in which front road wheels are driven directly from the prime mover and rear road wheels are connected to the prime mover by an assembly as described above with the drive member being connected to the prime mover and the driven member being connected to the rear road wheels.

In an another arrangement the driving assembly may be associated with a differential, either an inter-wheel differential or an inter-axle differential, and be arranged to control the differential to provide a limited slip differential.

There are various ways in which a driving assembly embodying the invention may be used. In a first way the drive assembly only operates to drive the rear wheels if slip is detected between the front and rear wheels. Alternatively, the drive device may be arranged so as to provide a permanent drive to the rear wheels unless the brakes are actuated whereupon the drive is disconnected. It is also possible for the driving assembly to be arranged so that torque transmission to the rear wheels is disconnected when a certain steering angle is exceeded or that the movement of the device into a torque transmitting state cannot occur if a certain steering angle has been exceeded. All these possibilities can easily be attained by operation of the brake associated with the driving assembly.

BRIEF DESCRIPTION OF THE DRAWINGS

The invention will now be described in detail by way of example with reference to the accompanying drawings in which.

DESCRIPTION OF PREFERRED EMBODIMENTS

Figure 1:
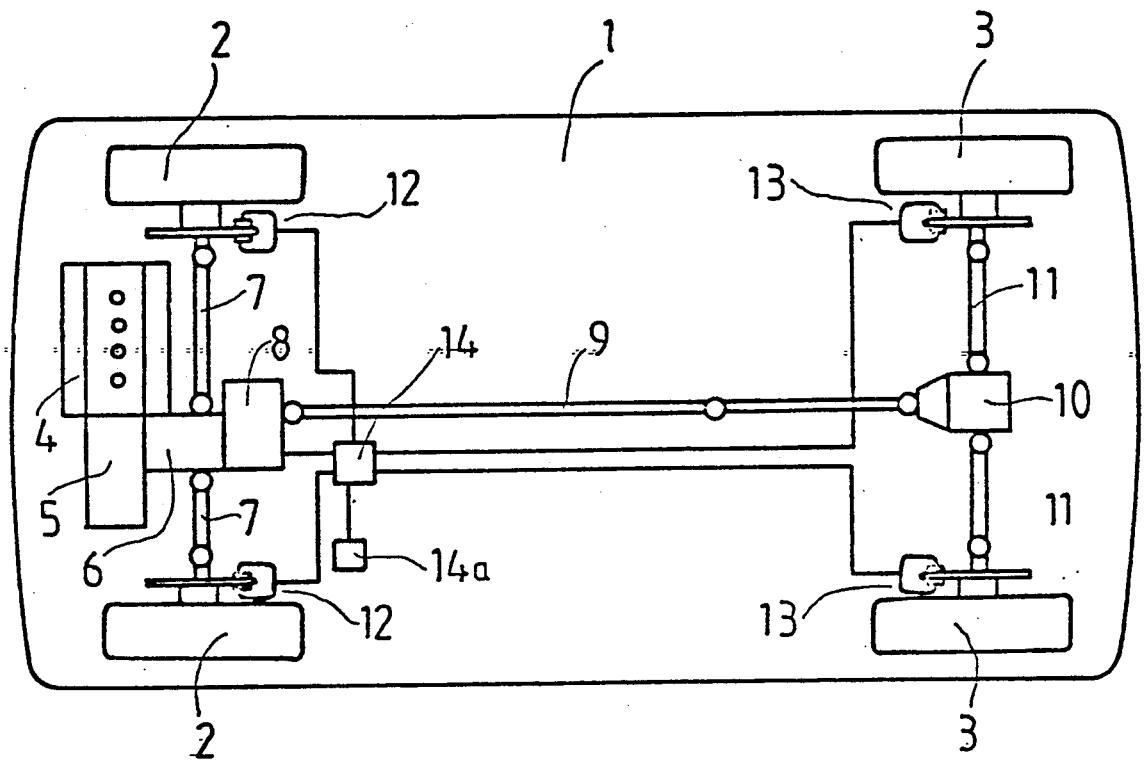
FIG. 1 is a diagram of a drive transmission for a motor vehicle embodying the invention.

Referring now to FIG. 1, the motor vehicle there shown has front wheels 2 and rear wheels 3. The vehicle has a prime mover in the form of an engine 4 which drives a change speed gearbox 5. From the gearbox 5 is driven a front axle differential 6 and the outputs of this differential are taken by drive shafts 7 to the front wheels 2. The rear wheels 3 are not continuously driven but may be driven through a driving assembly embodying the invention which is indicated at 8 and which is driven from the drive to the front axle differential 6. A multi part propeller shaft 9 is driven by the assembly 8 and in turn drives a rear wheel differential 10. The outputs from the differential 10 are taken by drive shafts 11 to the rear wheels 3.

The front wheels 2 are provided with disc brakes 12 and the rear wheels 3 with disc brakes 13. Signals are taken from the brakes 12 and 13 to a control member 14 which is arranged to control the driving assembly 8 in a manner which will be described in detail below. A second control member 14a is connected to the control member 14 and may be used to actuate the control member 14 independently of the signals received from the brakes 12.

Figure 2:
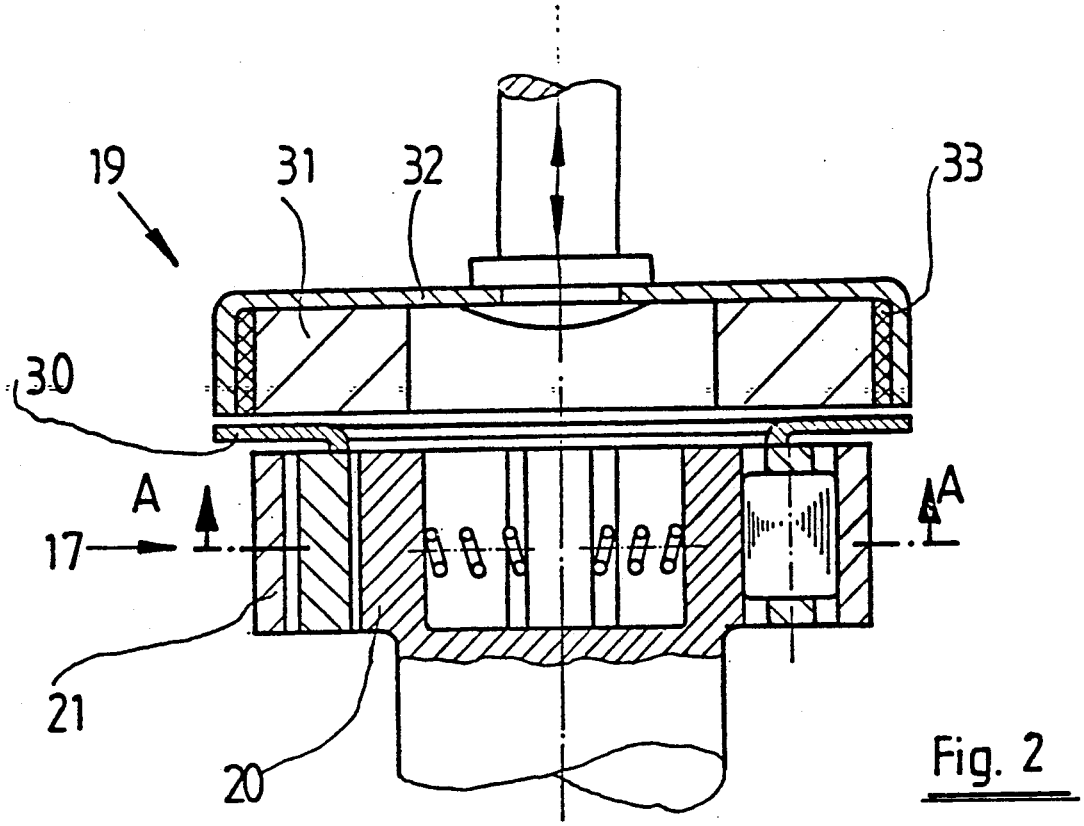
FIG. 2 is a section through a clutch and brake assembly forming part of a drive assembly embodying the invention.
Figure 3:
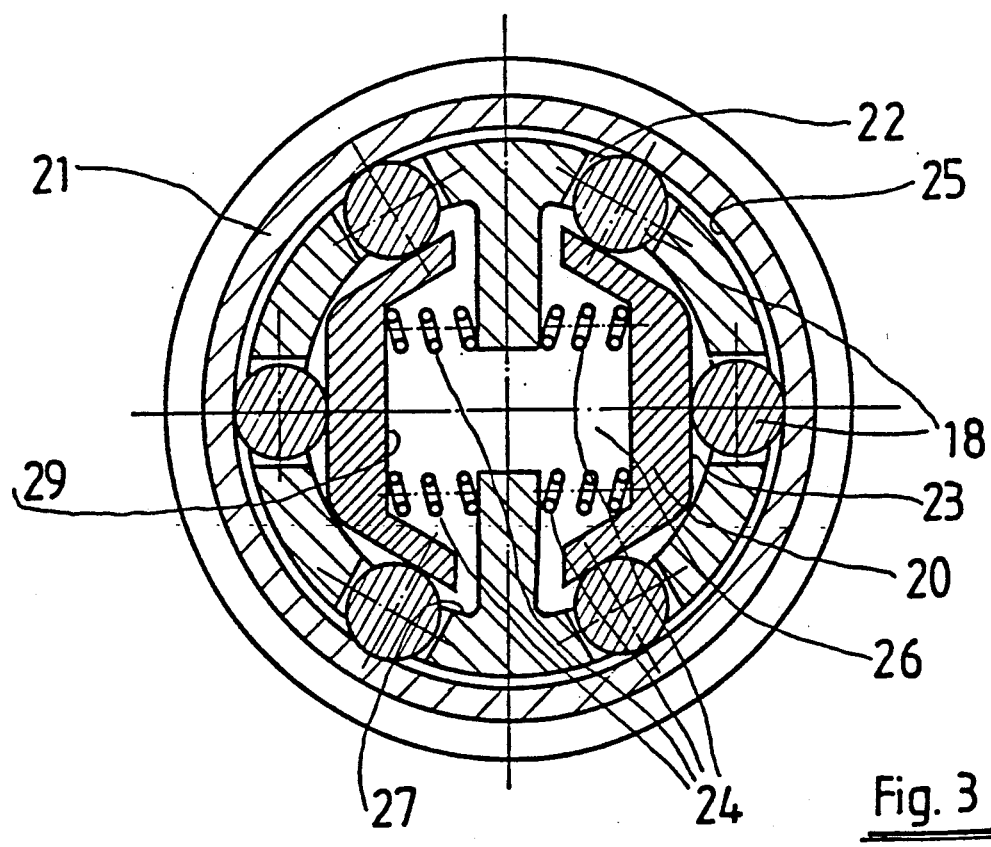
FIG. 3 is a section on the line A—A of FIG. 2.
Figure 4:
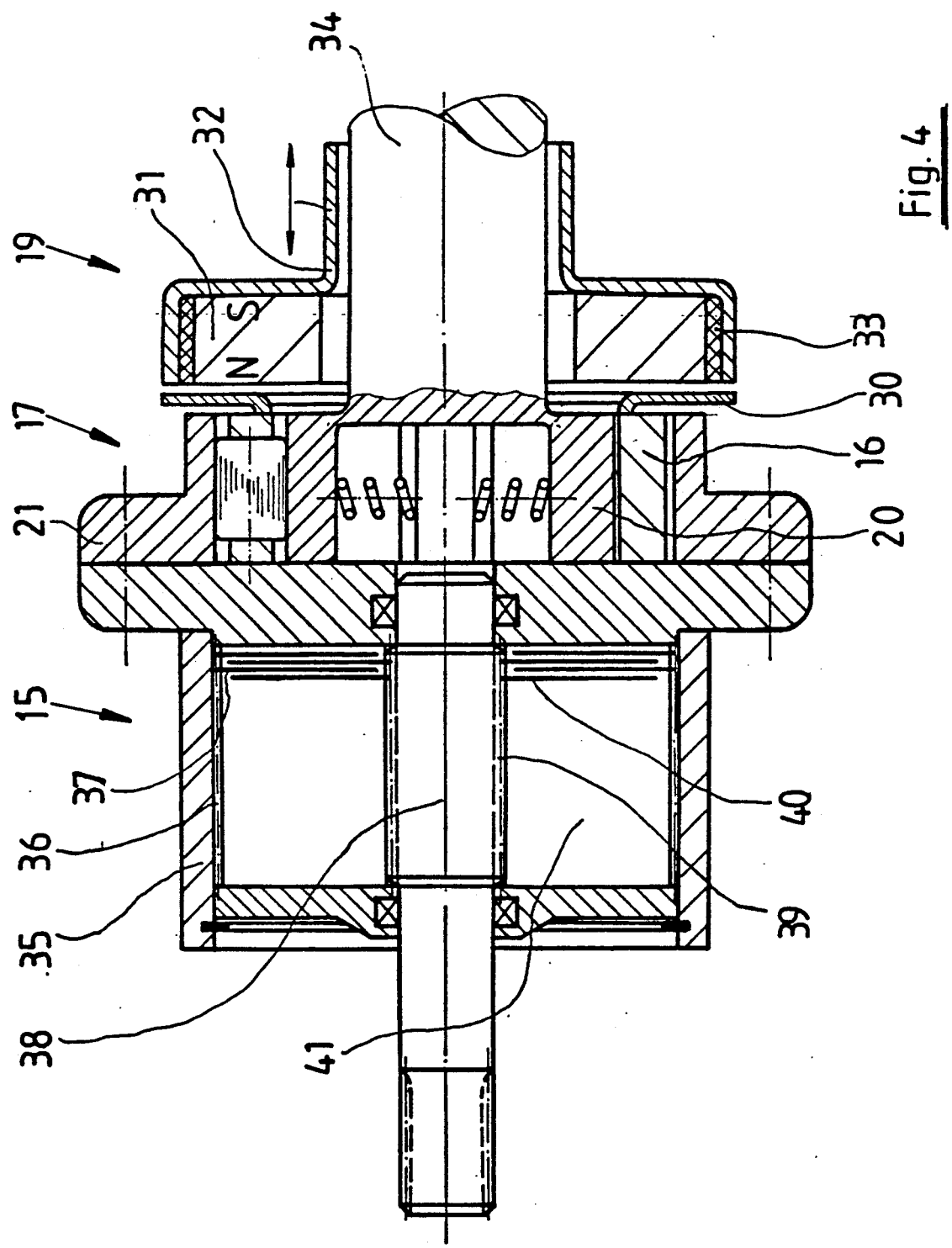
FIG. 4 is a longitudinal section of a driving assembly embodying the invention including a clutch and brake as described with reference to FIGS. 2 and 3.

Referring now to FIGS. 2, 3 and 4, these show a first embodiment of driving assembly embodying the invention. The assembly comprises a viscous shear coupling indicated generally at 15 and a clutch indicated generally at 17. The viscous shear coupling 15 comprises a housing 35 which is internally splined at 36. Engaged with the splines is a multiplicity of outer disc-like plates 37 which are preferably spaced a fixed distance apart. The hub of the viscous coupling is in the form of a shaft 38 which is externally splined at 39. Engaged on the splines 39 are disc-like plates 40 which are interleaved with the plates 37 and are free to move axially on the splines 39. It would be possible for there to be two inner plates 40 in between each adjacent pair of outer plates 37.

The hub 38 is mounted for rotation in the housing by bearings and seals 50. One of these is received in an end plate 51 which is secured in the housing barrel by a circlip 52. The right hand end of the viscous coupling is formed by an end plate 53 which is connected to the clutch.

The clutch comprises an outer or driven part 21 which is connected to the viscous coupling 15 and an inner or drive part 20 which is internally splined and is engaged by the end of a drive shaft 34. The outer member 21 has an inwardly directed cylindrical track 25. The inner member 20 is generally hexagonal shaped as shown in FIG. 3 so as to provide six flat faces 23 which are outwardly directed.

Between the inner and outer members 20 and 21 is a control member in the form of a cage 16. This cage is provided with six radial apertures 22 in each of which is mounted a torque transmitting element in the form of a ball 18. In one position of the clutch, shown in FIG. 3, the balls 18 are positioned at approximately the midpoints of the flat faces 23.

From the inner surface 27 of the cage there extend two oppositely-directed projections 28. These project into an aperture in the inner member defined by sides 29 and springs 24 engage between the projections and the sides 29 to centre the inner member in the rest position shown in FIG. 3. In this position the balls 18 are, as mentioned above, substantially at the mid-points of the flat faces 23 of the inner member.

Associated with the clutch 17 is a non-contact brake 19. The brake consists of a disc 30 which is connected to the cage 16. The disc 30 is made of material having a high magnetic hysteresis and the material is characterised by a low cohesive field strength and a comparatively high remanence and permeability.

Associated with the disc 30 is a permanent magnet 31 which is annular and which is held in a soft iron sleeve 32 by means of a cast resin layer 33. The sleeve 32 fits round the drive shaft 34 and means, not shown, is provided for moving the magnet 31 and sleeve 32 towards and away from the disc 30.

A driving assembly thus described is installed at 8 in FIG. 1 in a motor vehicle there shown. The drive shaft 34 is connected to the front axle differential 6 whereas the driven shaft 38 is connected to the propeller shaft 9.

With the parts of the clutch in the position shown in FIG. 3 the outer member 21 of the clutch can rotate relative to the inner member 20 in either direction of rotation without there being any torque transmission. Similarly, if the control member 16 is not braked, the inner member 20 can overrun the outer member since the inner member 20 and the cage 16 will rotate at the same speed and the balls 18 will roll on the track 25. However, if the cage 16 is braked then torque will be transmitted from the inner member to the outer member if the former runs faster than the latter although the clutch will still overrun if the outer member rotates faster than the inner member even if the brake is applied.

As has been mentioned the permanent magnet and the sleeve 32 are slidable relative to the drive shaft 34 and when they are in a position close to the disc 30 as shown in FIG. 4, the revolving poles of the permanent magnet 31 cause magnetisation and remagnetisation of the disc 30 and due to the magnetic hysteresis there is a braking effect on the brake disc which thus applies a retarding force to the cage 16. This retarding force is applied for so long as the magnet is in the position shown in FIG. 4, if it is moved to the right in that figure then the retarding force ceases.

When a retarding force is applied to the cage 16 then if the inner member tends to overrun the outer member torque will be transmitted from the inner member to the outer member.

Thus if one considers the operation of the vehicle of FIG. 1, since the drive shaft 34 is connected to the front wheel differential 6 and the driven shaft 38 to the propeller shaft 9, if the brake 19 is energised then if the front wheels spin relative to the rear wheels, torque will be transmitted through the assembly 8 to the rear wheels. The control member 14 is arranged so that if, in such circumstances, it senses that the brakes 12 have been applied it will disengage the brake 19 so that drive through the assembly 8 is disconnected. This prevents the possibility that the front wheels are locked by the brakes and the rear wheels are being driven which would tend to make the vehicle unstable.

The control means 14a can be externally controlled to engage the brake 19 but will be overridden by the control member 14. Thus if it is desired for the vehicle to operate in two-wheel drive the control member 14a would render the brake 19 inoperative. If it were desired to operate in four-wheel drive then the control member 14a would cause the brake 19 to be energised but this energisation would cease if the brakes 12 were applied, the disconnection being carried out by the control member 14.

The drive to the rear wheels takes place through the viscous coupling 35 which also acts as an inter-axle differential. The drive takes place when the outer member 21 is driven and it drives the housing 35 of the viscous coupling which in turn drives the driven member 38 by a viscous shear in the silicone fluid in the viscous coupling housing 35.

The clutch 17 is reversible in that in whichever direction the drive shaft 34 is rotated, if the brake 19 is energised, then torque will be transmitted from the inner member 20 to the outer member 21 and this in turn will drive the viscous coupling.

Figure 5:
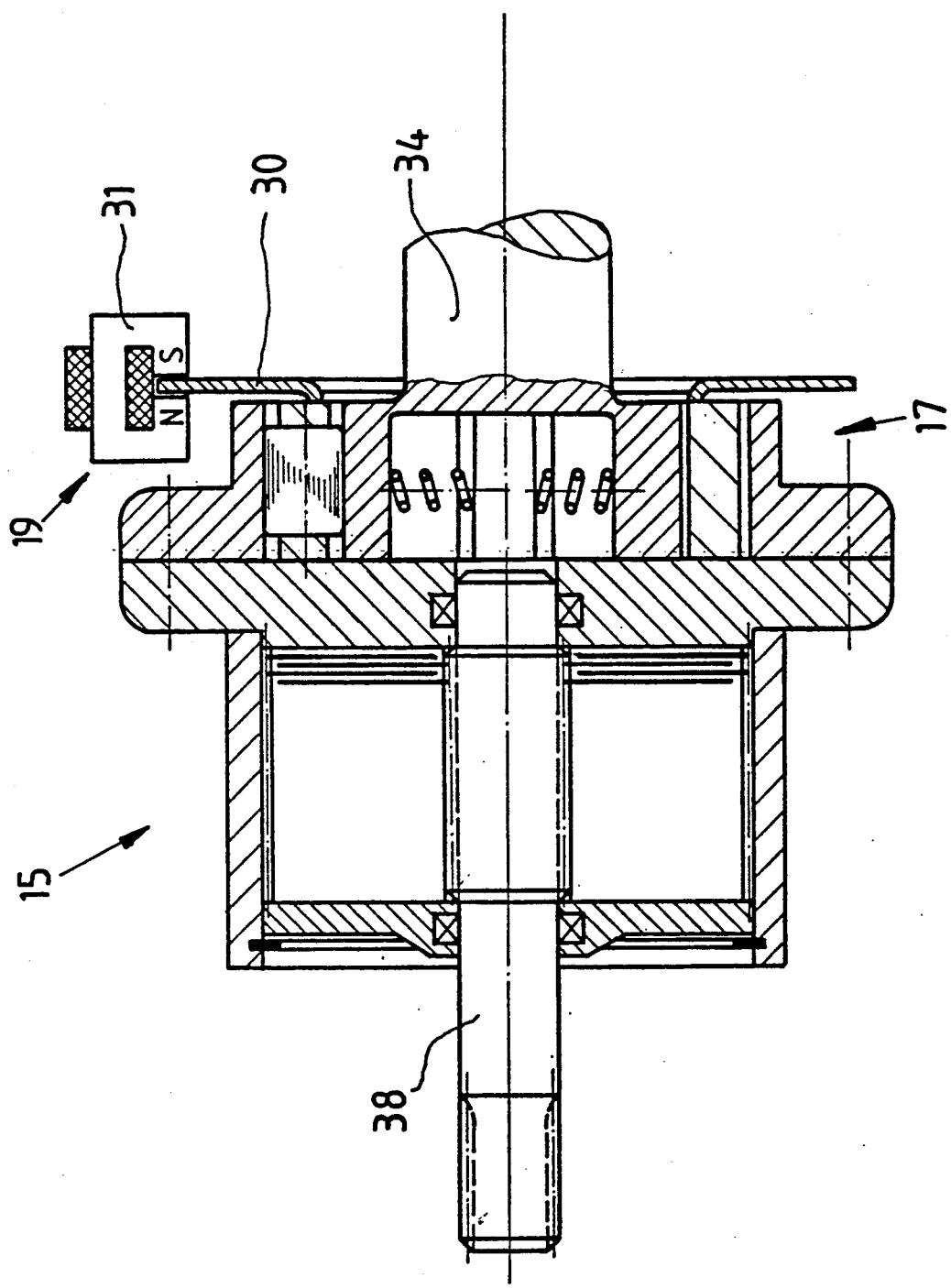
FIG. 5 is a view similar to FIG. 4 of another driving assembly showing a different type of brake.

FIG. 5 shows an arrangement which is substantially the same as FIG. 4 except that the hysteresis brake is replaced by an eddy current brake. As before the cage 16 has a brake disc 30 secured thereto and this is embraced around its edge by an electro-magnet 31. The energisation and de-energisation of the electro-magnet 31 is controlled by the control members 14 and 14a just as the latter controls the movement of the sleeve 32 for moving the magnet 31 closer to and further from the disc 30. The operation of the embodiment of FIG. 5 is otherwise the same as that of FIG. 4.

It has been described that the device 8 may be of the form shown in FIG. 4 or FIG. 5. In an alternative arrangement, the driving assembly 8 in FIG. 1 could be a multi-element differential across two elements of which would be connected in an assembly as shown in FIG. 4 or FIG. 5, with the shaft 34 being connected to one element of the differential and the shaft 38 to the other element of the differential. In this way, there is provided a limited slip differential which is controllable by energising or de-energising the brake 19.

The invention thus provides a driving assembly in which the viscous coupling may be brought into and out of the drive line easily by operation of the brake and there is no wear of the brake parts because the brakes used are non-contact brakes, i.e. brakes in which there is no physical contact between the two parts thereof.

The invention is particularly useful in the drive lines of motor vehicles having anti-lock brake systems so that the viscous coupling can be disconnected if the brakes, particularly the front brakes, are applied to prevent the vehicle becoming unstable.

What is claimed is:
1. A driving assembly, comprising:
 a drive member;
 a driven member;
 a viscous shear coupling; and
 a clutch between the drive member and the viscous shear coupling, the clutch comprising a drive part connected to the drive member and a driven part connected to the viscous shear coupling, torque-transmitting elements between said parts, a control member interposed between said parts and with which said elements are engaged, a brake comprising a first member connected to the control member and a second non-rotatable member, said first and second members being permanently held out of contact, means selectively operable to apply said brake to brake said control member independently of said drive part and said driven part, such that at all times if the driven part overruns the drive part, the clutch transmits no torque, while if the drive part overruns the driven part, torque is transmitted from the drive part to the driven part by said torque-transmitting elements when the brake is applied to brake the control member but the clutch transmits no torque from the drive part to the driven part when the said control member is not braked.

2. A driving assembly according to claim 1 wherein said brake is a hysteresis brake.

3. A driving assembly according to claim 2 wherein said brake comprises a brake disc of hysteresis material connected to the control member, a magnet and means to move the magnet towards and away from the disc.

4. A driving assembly according to claim 1 wherein the brake is an eddy current brake.

5. A driving assembly according to claim 4 wherein said brake comprises a brake disc connected to the control member and an electro-magnet embracing the edge of the disc.

6. A driven assembly, comprising:
a drive member;
a driven member;
a viscous shear coupling;
a clutch between the drive member and the viscous shear coupling, the clutch comprising a drive part connected to the drive member and a driven part connected to the viscous shear coupling, said parts of the clutch being arranged concentrically to be rotatable about a common axis to provide an inner part and an outer part, a control member arranged between said parts and provided with apertures in each of which a ball forming a torque-transmitting element is received so as to engage a cylindrical track on the outer part and a generally flat face on the inner part, the inner part having a number of relatively inclined flat faces equal to the number of balls, said inner part being provided with an aperture bounded by opposite sides and the control member having projections extending into said aperture and spring means acting between said projections and said sides of the aperture to bias the inner part to a position in which no torque is transmitted by the balls between said parts; and
a brake comprising a first member secured to the control member and a second non-rotatable member, said first and second members being permanently held out of contact, means selectively operable to apply said brake to brake said control member independently of said drive part and said driven part, such that at all times if the driven part overruns the drive part, the clutch transmits no torque, while if the drive part overruns the driven part, torque is transmitted from the drive part to the driven part by said balls when the brake is applied to brake the control member but the clutch transmits no torque from the drive part to the driven part when said control member is not braked.

7. A driving assembly, comprising:
a drive member;
a driven member;
a viscous shear coupling;
a clutch between the drive member and the viscous shear coupling, the clutch comprising a drive part connected to the drive member and a driven part connected to the viscous shear coupling, torque-transmitting elements between said parts, a control member interposed between said parts and with which said elements are engaged; and
a hysteresis brake comprising a break disc of hysteresis material connected to the control member, an annular permanent magnet mounted on a soft iron sleeve, the drive member passing rotatably through the central aperture of the magnet, means for selectively applying and releasing the brake by sliding the sleeve relative to the drive member towards and away from the brake disc without contacting the latter, application of the brake braking said control member, such that at all times if the driven part overruns the drive part the clutch transmits no torque while if the drive part overruns the driven part, torque is transmitted from the drive part to the driven part by said torque-transmitting elements when the brake is applied to brake the control member but the clutch transmits no torque from the drive part to the driven part when said control member is not braked.

8. A drive transmission for a motor vehicle, comprising:
a prime mover;
a driveline between the prime mover and road wheels of the vehicle, the driveline including a driving assembly comprising a drive member connected to the prime mover;
a driven member connected to the road wheels;
a viscous shear coupling; and
a clutch between the drive member and the viscous shear coupling and comprising a drive part connected to the drive member, a driven part connected to the viscous shear coupling, torque-transmitting elements between said parts, a control member interposed between said parts and with which said elements are engaged, a brake comprising a first member connected to the control member and a second non-rotatable member, said first and second members being permanently held out of contact, means selectively operable to cause sad brake to brake said control member independently of said drive part and said driven part, such that at all times if the driven part overruns the drive part, the clutch transmits no torque to the prime mover from the road wheels while if the drive part overruns the driven part, torque is transmitted from the drive part to the driven part and thus, from the prime mover to the road wheels, by said torque-transmitting elements when the brake is applied to brake the control member but the clutch transmits no torque from the road wheels to the prime mover when said control member is not braked.

9. A driving assembly according to claim 8 including front road wheels which are directly driven from the prime mover and rear road wheels which are connected to the prime mover via said driving assembly.

10. A driving assembly, comprising:
a multi-element, differential gear;
a drive member connected to one of the elements of the differential gear;
a driven element connected to another element of the differential gear;
a viscous shear coupling; and
a clutch between the drive member and the viscous shear coupling, the clutch comprising a drive part connected to the drive member and a driven part connected to the viscous shear coupling, torque-transmitting elements between said parts, a control member interposed between said parts, and with which said elements are engaged, a brake comprising a first member connected to the control member and a second non-rotatable member, said first and second members being permanently held out of contact, means selectively operable to apply said brake to brake said control member independently of said drive part and said driven part, such that at all times if the driven part overruns the drive part, the clutch transmits no torque while if the drive part overruns the driven part, torque is transmitted from the drive part to the driven part by said torque-transmitting elements when the brake is applied to brake the control member but the clutch transmits no torque from the drive part to the driven part when said control member is not braked.

11. A driving assembly according to claim 10 wherein said differential gear is an inter-wheel differential gear.

12. A driving assembly according to claim 10 wherein said differential gear is an inter-axle differential gear.

* * * * *

UNITED STATES PATENT AND TRADEMARK OFFICE
CERTIFICATE OF CORRECTION

PATENT NO. : 5,007,498
DATED : April 16, 1991
INVENTOR(S) : Helmut Wiese & Paul-Erich Schönenbrücher It is certified that error appears in the above-identified patent and that said Letters Patent is hereby corrected as shown below:

Title page:

[75] Inventors: Helmut Wiese, Neunkirchen-Seelscheid;
Paul-Erich Schönenbrücher, Much-Kranüchel,
both of Federal Republic of Germany Signed and Sealed this Fifteenth Day of September, 1992

*Attest:*

DOUGLAS B. COMER

*Attesting Officer*     *Acting Commissioner of Patents and Trademarks*